Patented May 7, 1946

2,399,742

UNITED STATES PATENT OFFICE 2,399,742

TANNIC ACID COMBINATIONS OF POSTERIOR PITUITARY EXTRACTS

Edward G. Jones, Detroit, and Oliver Kamm, Grosse Pointe Farms, Mich., assignors to Parke, Davis & Company, Detroit, Mich., a corporation of Michigan No Drawing. Application April 14, 1941, Serial No. 388,552

9 Claims. (Cl. 167—74)

The invention relates to therapeutic agents in which the active ingredients is a relatively water-insoluble product of tannic acid and a posterior pituitary derived physiologically active peptide or protein-like material which is normally quite soluble in water.

It is known that many therapeutic agents quickly exercise their action upon the human organism so that, regardless of the dosage employed, the desired effect is produced for only a relatively short period of time. Moreover, some medicaments are known to be destroyed or eliminated so rapidly by the body that a large part of the total dosage never has time to exercise its beneficial effects. This also constitutes a loss of valuable medicament, especially where water-soluble substances are being used.

Various means have been proposed for extending the action of therapeutic agents over periods of time longer than the ordinary so as to duplicate the normal physiologic mechanisms of the body. For example, it has been proposed to treat physiologically active protein products with compounds of metals, whereby the final product contains the metals used. In such cases, the metal itself is a complicating and often undesirable factor, not only from a physiological point of view, but also because the metal may deleteriously affect the activity and the stability of the final product.

The present invention relates to valuable physiologically active products obtainable from the posterior pituitary lobe which are normally water-soluble and which can be treated with tannic acid to give water-insoluble products. The substances of the present invention, although releasing their effects over long periods of time, do not possess the above mentioned disadvantages which have been present in the prior products. Also, said substances make available therapeutically effective substitutes for inactive or deficient glandular tissue of the body.

We have found that extremely effective preparations are obtainable by treating the water-soluble physiologically active substances derived from the posterior-pituitary gland with tannic acid. For example, tannic acid can be combined with the known posterior pituitary derived preparations having antidiuretic activity, the effect of increasing blood pressure, and also of stimulating uterine contractions, such as the product sold under the trade name Pituitrin, or, tannic acid can be combined with the isolated principles showing these effects separately and known variously by proprietary names such as Pitressin, Vaso-pressin, Pitocin, Oxytocin, etc. Some of these materials which can be combined with tannic acid are described in United States Patents 1,373,551 and 1,960,493.

For example, Patent No. 1,960,493 describes an extract of the posterior lobe of the pituitary gland containing the oxytocic hormone substantially free from the pressor hormone concentrated to such an extent that one international unit of oxytocic activity is represented by 0.1 milligram or less of said extract. This patent also describes an extract containing the pressor hormone substantially free from the oxytocic hormone concentrated to such an extent that one international unit of pressor activity is represented by 0.1 milligram or less of said extract. Each of said extracts may be combined with tannic acid to produce products coming within the scope of the present invention.

Other products derived from the posterior pituitary which may be treated with tannic acid in accordance with the invention are those with antidiuretic properties but with practically no effect on blood pressure and described in United States Patent No. 2,011,443 as being obtained by alkali treatment of a posterior pituitary lobe extract. We can also use tannic acid on the antidiuretic product of the United States Patent No. 2,011,447 wherein an extract of the pituitary has been treated with a sulfite, thiosulfate or the like to destroy pressor and oxytocic activities.

The products of the invention are water insoluble and may be administered in aqueous or oily, or the like suspensions, or they may be injected in the form of pellets. Whereas preparations of posterior pituitary gland hormones have frequently caused an undesirable increase in blood pressure and have produced headaches and other deleterious reactions, the preparations of the invention have not produced such effects. Furthermore, the effectiveness of the tannate combination has been found to be many times greater than that of the posterior pituitary hormones from which the combinations are derived when the latter are administered hypodermically in aqueous solution.

The invention will be illustrated by the following examples.

Example 1

A quantity of commercial acetone-desiccated posterior pituitary gland material is thoroughly extracted with a slightly acid aqueous solution, heat treated at about 95° C., cooled, filtered, concentrated, the concentrate salted-out with ammonium sulfate, the salted-out product extracted with glacial acetic acid and the hormones, including the pressor-antidiuretic and oxytocic activities, precipitated from the glacial acetic acid extract by a mixture of 1 part of diethyl ether and two of petroleum ether. The precipitate is filtered off and dried. Most of the inert material of the original desiccated gland is removed by this procedure and the dried product contains practically all of the therapeutically and physiologically valuable substances of the posterior pituitary lobe. A product of this type is described in United States Patent 1,960,493 and is the material treated therein for separation of pressor and oxytocic fractions. As shown by said patent, page 1, column 2, line 108, to page 2, column 1, line 54, the material contains 80–90% of the activity in the original desiccated gland material and assays 450–900% of standard according to weight, the oxytocic and pressor activities being practically balanced. This product contains 10 international units of activity per milligram of solid material.

40 g. of the dry, purified posterior pituitary lobe extract, obtained as above described, are dissolved in 4 liters of 98% acetic acid, 10 liters of sulfuric ether added, and the mixture filtered rapidly by suction after standing about 15 minutes. The precipitate thus filtered off is washed with ether and solution of the product in acetic acid and precipitation with ether repeated one or more times, after which acetic acid is removed from the final precipitate by using a vacuum. Although this treatment does not completely remove oxytocic activity, it gives a product consisting essentially of the pressor and antidiuretic principle of the posterior pituitary lobe and is suitable for combination with tannic acid as described below.

A 5% solution of C. P. tannic acid in 0.1% acetic acid solution containing 0.5% chlorbutanol added as a preservative and antiseptic is added dropwise and with continuous stirring to an equal volume of a 5% solution of the above described purified posterior pituitary extract dissolved in the same solvent in which the tannic acid is dissolved. The mixture is allowed to stand an appropriate time, e. g. about 16 to 24 hours, at 6° C. to insure self-sterilization of the product. The clear supernatant liquid is decanted off and the precipitate recovered by suction filtration, using hardened paper previously washed thoroughly with a clear, sterile solution of 0.1% acetic acid containing 0.5% chlorbutanol.

The precipitate is the tannate of the pressor and antidiuretic principle of the posterior pituitary. It is preferably thoroughly washed a few more times in the cold with a larger quantity of chloretone-acetic acid solution. The product is then dried in vacuo over $P_2O_5$.

Although it may not be necessary, we prefer to give the final dry product a treatment with acetone to remove any free tannic acid and similar substances that may be present. Hence, the dry tannate is washed with acetone and dried in vacuo. If desired, the filtrations described herein may be conducted in sterile apparatus under a sterile rubber dam. The product thus obtained is a practically white amorphous powder insoluble in water but dissolving upon addition of sodium hydroxide solution to a pH of 8 to 9. The nitrogen content is approximately 9% and the ash about ½%. This product can be formed into pellets under pressure with or without the use of a suitable binder. Alternatively, it can be prepared in the form of suspensions in various liquids, such as the suspension described under Example 2. It is remarkably useful in the treatment of diabetes insipidus. Although the active principles of the posterior pituitary are apparently organic amine compounds, while tannic acid is acidic in nature, we have found that the tannic acid does not destroy the activity, but the combination of this example is a strong antidiuretic and is many times more effective and for much longer periods of time in a given dosage than the free antidiuretic principle.

*Example 2*

A quantity of the final dry product from Example 1 ground to a fine powder and having pressor and antidiuretic activities can be assayed for pressor units and suspended in high-grade pure peanut oil in amounts sufficient to give 5 pressor units per cc. or other potency. By observing the usual sterile precautions in preparing the solution in this example, a final suspension is obtained which may be put up in sterile ampoules or in other convenient form for use. Instead of using an oil, water, physiological saline solution or other suitable aqueous liquid may be used as a suspending agent. The tannate can be prepared and then mixed with the suspending liquid or can be produced in situ in such liquid.

*Example 3*

This example may be carried out as described above under Examples 1 or 2, but instead of using a product purified from inert materials and containing some oxytocic activity, one may combine tannic acid with a more completely isolated pressor-antidiuretic fraction from the posterior pituitary containing substantially no oxytocic principle as described in United States Patent 1,960,493. For example, as set forth in said patent, page 3, column 1, line 53, to page 3, column 2, line 12, material assaying 3125% by pressor test and 700% by oxytocic test may be dissolved in 98% acetic acid thereby resulting in a material having a potency eighty times as great as the U. S. P. standard, while the oxytocic principle has been obtained having a potency one hundred and fifty times that of the above standard. The pressor principle as obtained by the above described fractionation process is a white solid, freely soluble in water and has been named beta-hypophamine. It can be obtained substantially free from the oxytocic principle, although it always has a slight effect on smooth muscle due probably to the fact that the pressor principle itself possesses this property to a slight degree.

*Example 4*

Dry isolated oxytocic fraction of the pituitary gland separated from the pressor and antidiuretic fraction is used as a starting material. It may be obtained, for example, as described in United States Patent 1,960,493 or by any other suitable method. This product contains the oxytocic principle or hormone (alpha-hypophamine) substantially free from the pressor principle or hormone (beta-hypophamine). A 4% aqueous solution of this fraction is made up and an equal volume of a 4% solution of pure tannic acid in 0.1% acetic acid, containing a preservative if desired, is slowly added. After the mixture has stood overnight at a low temperature, the clear liquid is decanted off and the precipitated tannate filtered off. After washing the precipitate and drying it in vacuo, it can be directly used or it can be ground to a powder and suspended in a sterile oily vehicle and used for injection to produce a protracted oxytocic effect free from pressor and antidiuretic effects.

Example 5

The starting material of this example is the antidiuretic product having substantially no effect on blood pressure and substantially no oxytocic activity obtained, for example, as described in United States Patent 2,011,443. This product is water-soluble and is made up in the form of a 6% aqueous solution. To this aqueous solution there is added an equal volume of a 6% solution of tannic acid in 0.1% acetic acid solution containing slightly less than 1% of a preservative such as chlorbutanol, phenol, cresol, etc. After the tannic acid solution has been added slowly, the mixture is allowed to stand at a temperature below about 10° C. for about one day, at the end of which time the product is sterile. The tannate product which has settled out is filtered off, washed thoroughly and dried at a low temperature. It can be made up for use as described for the product of Example 4 but is useful as a posterior pituitary derived hormone, obtained by alkali treatment followed by tannic acid treatment, which has antidiuretic properties but substantially no effect on blood pressure and substantially no oxytocic activity.

Example 6

The product of this example is prepared by treating with tannic acid an extract of the pituitary gland which has been treated with a chemical of the type of a bisulfite, a sulfite, a thiosulfate, a hydrosulfite, sulfur dioxide and the like until pressor and oxytocic activity are destroyed, but which retains antidiuretic activity. Tannic acid may thus be reacted with any of the products described, for example, under United States Patent 2,011,447. The treatment with tannic acid and the isolation of the product of the treatment with tannic acid are carried out in a manner analoguous to that described in the preceeding examples. The product is a very satisfactory antidiuretic which has a protracted action and is without deleterious side effects.

Instead of using peanut oil, other vegetable or glyceride oils and fats and other non-irritating mineral and vegetable oils and organic solvents and combinations of the same, e. g. with benzyl benzoate, etc. may be used as suspending liquids for the tannic acid combinations with the various active fractions of the posterior pituitary gland. Water and aqueous liquids, such as physiological saline or glucose, can also be used as suspending agents.

The products of the invention manifest their actions on the body without delay, but the effect is prolonged for a surprising length of time and there is practically complete utilization of the medicament for the purpose intended. Moreover, there are no undesirable side effects produced as is at times the case with the known preparations of the posterior pituitary lobe.

What we claim as our invention is:

1. A therapeutic product comprising a water-insoluble combination of tannic acid and a water-soluble solid extract of the posterior lobe of the pituitary gland, said extract being of the class consisting of an extract containing the pressor principle, substantially free from the oxytocic principle and an extract containing the oxytocic principle substantially free from the pressor principle.

2. A therapeutic product comprising a suspension in an inert oil of a water-insoluble combination of tannic acid and a water-soluble solid extract of the posterior lobe of the pituitary gland containing a hormone of the class consisting of alpha-hypophamine and beta-hypophamine.

3. A therapeutic product comprising a water-insoluble combination of tannic acid and a water-soluble solid extract of the posterior lobe of the pituitary gland containing at least 10 international units of activity per milligram of solid extract and having the physiological property of raising the blood pressure when administered hypodermically.

4. A therapeutic product comprising a water-insoluble combination of tannic acid and a water-soluble solid extract of the posterior lobe of the pituitary gland containing the pressor principle, substantially free from the oxytocic principle, and having the physiological property of raising the blood pressure when administered hypodermically.

5. A therapeutic product comprising a suspension in an inert oil of a water-insoluble combination of tannic acid and a water-soluble solid extract of the posterior lobe of the pituitary gland containing the pressor hormone, substantially free from the oxytocic hormone, concentrated to such an extent that one international unit of pressor activity is represented by 0.1 milligram or less of said extract, and having the physiological property of raising the blood pressure when administered hypodermically.

6. A therapeutic product comprising a suspension in an inert oil of a water-insoluble combination of tannic acid and a water-soluble solid extract of the posterior lobe of the pituitary gland containing beta-hypophamine.

7. A therapeutic product comprising a water-insoluble combination of tannic acid and a water-soluble solid extract of the posterior lobe of the pituitary gland containing the oxytocic principle, substantially free from the pressor principle, and having the physiologically property of contracting uterine muscle when administered hypodermically.

8. A therapeutic product comprising a suspension in an inert oil of a water-insoluble combination of tannic acid and a water-soluble solid extract of the posterior lobe of the pituitary gland containing the oxytocic hormone, substantially free from the pressor hormone, concentrated to such an extent that one international unit of oxytocic activity is represented by 0.1 milligram or less of said extract, and having the physiological property of contracting uterine muscle when administered hypodermically.

9. A therapeutic product comprising a suspension in an inert oil of a water-insoluble combination of tannic acid and a water-soluble solid extract of the posterior lobe of the pituitary gland containing alpha-hypophamine.

EDWARD G. JONES.
OLIVER KAMM.